United States Patent Office 3,216,153
Patented Nov. 9, 1965

3,216,153
TREPANNING TOOL
Peter A. Saville and Desmond M. Franks, Staplehurst, Tonbridge, England, assignors to Diagrit Electrometallics Limited, Kent, England
Filed July 8, 1963, Ser. No. 293,322
2 Claims. (Cl. 51—209)

The invention relates to a trepanning tool and it has for its object to avoid a need for internal springs to eject the core produced by a drilling operation, or, when no such springs are provided, to avoid a need to stop the machine so that the tool can be removed and the core pushed out. While not limited in this respect the invention is particularly applicable in the case where the tool has its cutting edge formed by an adhered coating of an abradant (e.g., diamond dust) and is for use in drilling holes through such materials as glass fibre laminates, asbestos or glass.

The trepanning tool of the invention includes a tubular operative portion with, at the end remote from its leading cutting edge, a contiguous, coaxial, tubular extension of larger internal diameter provided with at least one window in its cylindrical wall through which a core formed by the drilling operation, and raised to the level of the window during a subsequent drilling operation, will be expelled centrifugally. In this way the subsequent drilling operations cause the cores formed during the preceding ones automatically to be expelled while the machine is running.

If the presence of the window should result in an undesirable torsional weakening of the tubular extension the latter, according to a feature of the invention, can have its wall made thicker than that of the operative portion whereby to give it sufficient strength to withstand the driving torque applied during use.

According to a further feature the tubular extension, at the end remote from the operative portion, is integral with a coaxial shank for engagement by a chuck on a driven spindle of a machine for performing the drilling operation.

Figure 1:
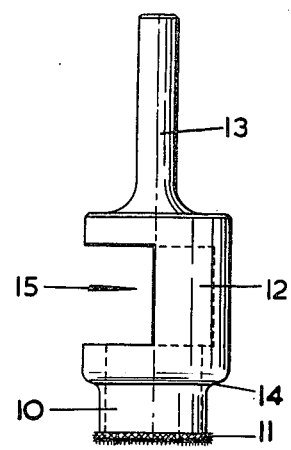
Figure 2:
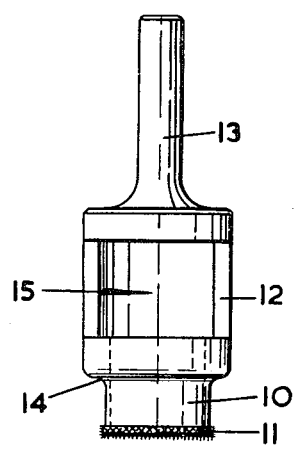

In the drawings:
FIGURE 1 is a side elevation of one form of the trepanning tool of the invention, and
FIGURE 2 is an elevation thereof looking from the left-hand side of FIGURE 1.

The trepanning tool shown in the drawings includes an operative portion 10 which is tubular and has a wall-thickness of about $\frac{1}{32}$ of an inch. The lower, operative, annular cutting edge has an adhered coating of diamond, or other abradant dust indicated at 11, and the upper end of portion 10 is integral with a tubular extension 12, which, in turn, has its upper end integral with a solid shank 13 for engagement in a chuck of a drilling machine.

The internal and external diameters of the extension 12 are made greater than those of the operative portion to an extent which results in the wall-thickness of the said extension being greater than that of the operation portion, and this produces an annular shoulder 14 at a distance from the cutting edge sufficient to enable a hole to be drilled through a workpiece of predetermined thickness.

A portion of the cylindrical wall of the extension 12 is removed to provide a window which is indicated at 15 and has a chordwise dimension somewhat greater than the diameter of the cores produced by the drilling operation.

In use the trepanning tool is used to drill one hole in a workpiece, and then another one, and so on, until the cores within the bore of the operative portion 10 are successively raised to the region of the window 15. Owing to the bore in extension 12 being of greater diameter than that in operative portion 10 each core as it enters the bore in the extension moves into an eccentric position such that it will be thrown out through the window by centrifugal action while the trepanning tool is being driven.

Although the cutting edge of the tool in the example described is coated with abradant dust, it will readily be understood that it could instead be made of cutting steel or tungsten carbide.

If found necessary in any particular case it can be arranged for the extension 12 to be surrounded, with adequate spacing, by a coaxial cylindrical guard to intercept the cores as they are flung out of the window 15.

What we claim as our invention and desire to secure by Letters Patent of the United States is:

1. A trepanning tool comprising a tubular operative portion and a contiguous, coaxial, tubular extension, said tubular operative portion provided at the end remote from said tubular extension with a coaxially annular flat abradant surface with its plane at right-angles to the axis of said tubular operative portion, said annular abradant surface having an internal diameter which is not greater than the internal diameter of said tubular operative portion, said tubular extension having an internal diameter greater than the internal diameter of said tubular operative portion, and said tubular extension having in its wall a window having a chordwise dimension greater than the internal diameter of said tubular operative portion.

2. A trepanning tool comprising a tubular operative portion, a coaxial tubular extension and a coaxial shank, said coaxial tubular extension intermediate said tubular operative portion and said shank, said tubular operative portion provided at the end remote from said tubular extension with a coaxially annular flat abradant surface with its plane at right-angles to the axis of said tubular operative portion, said annular abradant surface having an internal diameter which is not greater than the internal diameter of said tubular operative portion, said tubular extension having an internal diameter greater than the internal diameter of said tubular operative portion, and said tubular extension having in its wall a window having a chordwise dimension greater than the internal diameter of said tubular operative portion.

References Cited by the Examiner
UNITED STATES PATENTS 2,626,667   1/63   Spiller _____ 77—69
2,996,061   8/61   Miller _____ 125—20

FOREIGN PATENTS 777,245   11/34   France.

ROBERT C. RIORDON, Primary Examiner.
LESTER M. SWINGLE, Examiner.